US009746580B2

(12) United States Patent
Hayes et al.

(10) Patent No.: US 9,746,580 B2
(45) Date of Patent: Aug. 29, 2017

(54) ELECTRONICS ENABLING MUON TOMOGRAPHY USING AMBIENT COSMIC RADIATION

(71) Applicant: Decision Sciences International Corporation, Poway, CA (US)

(72) Inventors: James J. Hayes, Fort Irwin, CA (US); Michael James Sossong, Ramona, CA (US)

(73) Assignee: Decision Sciences International Corporation, Poway, CA (US)

( * ) Notice: Subject to any disclaimer, the term of this patent is extended or adjusted under 35 U.S.C. 154(b) by 0 days.

(21) Appl. No.: 15/019,800

(22) Filed: Feb. 9, 2016

(65) Prior Publication Data

US 2016/0231455 A1  Aug. 11, 2016

Related U.S. Application Data

(60) Provisional application No. 62/114,052, filed on Feb. 9, 2015, provisional application No. 62/114,056, filed on Feb. 9, 2015.

(51) Int. Cl.
*G01V 5/00* (2006.01)
*G06T 7/00* (2006.01)
*G06T 11/00* (2006.01)

(52) U.S. Cl.
CPC .......... *G01V 5/0075* (2013.01); *G06T 7/0002* (2013.01); *G06T 11/008* (2013.01);
(Continued)

(58) Field of Classification Search
CPC .... G01V 5/0075; G06T 7/0002; G06T 11/008
See application file for complete search history.

(56) References Cited

U.S. PATENT DOCUMENTS 8,536,527 B2 * 9/2013 Morris ................. G01N 23/046
250/306
2006/0031719 A1   2/2006 Bower, III et al.
(Continued)

FOREIGN PATENT DOCUMENTS

| WO | 2008/070349 A2 | 6/2008 |
| WO | 2010/025300 A2 | 3/2010 |
| WO | 2016/130584 A1 | 8/2016 |

OTHER PUBLICATIONS

International Search Report and Written Opinion dated May 26, 2016 for International Application No. PCT/US2016/017202, filed on Feb. 9, 2016 (6 pages).
(Continued)

*Primary Examiner* — David Porta
*Assistant Examiner* — Mindy Vu
(74) *Attorney, Agent, or Firm* — Perkins Coie LLP (57) ABSTRACT

Techniques, systems and apparatus are described for a multimode passive detection system (MMPDS). A MMPDS includes a detector assembly of array of drift tubes arranged as detector modules to generate detector signal data representing electrical responses to cosmic ray charged particles passing through respective detector modules and traversing through a volume of interest (VOI). Detector circuitry measures the generated detector signal data and outputs the measured detector signal data as spatially segregated data streams corresponding to respective detector modules. A clock system distributes a master clock signal throughout the detector circuitry. A computer cluster including nodes of computing devices merges the spatially segregated data streams into temporally segregated data, obtains information on tracks of the cosmic ray charged particles based on the temporally segregated data, reconstructs an image of the volume of interest based on the obtained information, and
(Continued)

identifies an object in the VOI based on the reconstructed image.

19 Claims, 6 Drawing Sheets

(52) U.S. Cl.
CPC ............... *G06T 2207/10072* (2013.01); *G06T 2207/20221* (2013.01); *G06T 2207/30232* (2013.01)

(56) References Cited

U.S. PATENT DOCUMENTS

| | | | |
|---|---|---|---|
| 2006/0104536 A1 | 5/2006 | Hsieh et al. | |
| 2008/0121689 A1 | 5/2008 | Good et al. | |
| 2008/0191133 A1* | 8/2008 | Morris | G01N 23/20 250/307 |
| 2010/0168947 A1 | 7/2010 | Winso et al. | |
| 2011/0049355 A1 | 3/2011 | Fuhrer et al. | |
| 2011/0257534 A1 | 10/2011 | Sano et al. | |
| 2012/0104259 A1 | 5/2012 | Mann | |
| 2012/0132820 A1 | 5/2012 | Iwakiri et al. | |
| 2014/0270034 A1* | 9/2014 | Clayton | G01V 5/0091 376/154 |
| 2016/0231456 A1 | 8/2016 | McKenney et al. | |

OTHER PUBLICATIONS

International Search Report and Written Opinion dated May 6, 2016 for International Application No. PCT/US2016/017185, filed on Feb. 9, 2016 (8 pages).

Nguyen, H.Q., et al., "Clock synchronisation in multi-transceiver HF radar system," 2011 IEEE International Conference on Signal Processing, Communications and Computing (ICSPCC), pp. 1-6, Sep. 2011.

Nguyen, H.Q., et al., "Noise immunity enhancement for a distributed clock system in digital HF radar," Proceedings of the 6th International Conference on Broadband Communications and Biomedical Applications (IB2COM), pp. 227-231, Nov. 2011.

\* cited by examiner

ELECTRONICS ENABLING MUON TOMOGRAPHY USING AMBIENT COSMIC RADIATION

CROSS REFERENCE TO RELATED APPLICATIONS

This patent document claims the benefit of priority of U.S. Provisional Patent Application No. 62/114,052, filed on Feb. 9, 2015, and U.S. Provisional Patent Application No. 62/114,056, filed on Feb. 9, 2015. The entire contents of the before-mentioned patent applications are incorporated by reference as part of the disclosure of this document.

TECHNICAL FIELD

This application relates to devices, techniques, storage media embodying computer program products and systems for tomographic imaging using ambient cosmic rays.

BACKGROUND

Tomographic imaging systems have been developed to rely on active sources of radiation with well-characterized illumination beams. Examples of active radiation source tomographic imaging systems include x-ray CT scanning systems.

Large particle detector arrays such as those used in high-energy particle research facilities (e.g., European Council for Nuclear Research (CERN) and the Fermi National Accelerator Laboratory (Fermilab)) have been designed to detect a specified range of particles and/or particle energies for addressing a specific detection problem.

SUMMARY

Techniques, systems, storage media embodying computer program products and devices are described for time synchronizing signals coming from multiple detector arrays to a common system clock in order to record the signals from the multiple detector arrays against a common time base. In a Multi-Mode Passive Detection System (MMPDS), an array of detectors (e.g., drift-tube sensors) can be configured to enable tomographic imaging of a volume of interest (VOI) using ambient cosmic rays as the illuminating radiation source. To record detector signals from multiple detector arrays against a common time base, individual detector arrays (e.g., drift tubes) are conditioned, pulses corresponding to passage of a cosmic ray based particle through a drift tube are detected, and the detected pulses are converted to a digital signal that are timed according to a system-wide synchronized clock. In addition, the system-wide synchronized clock signal can be distributed through the detector arrays in such a way as to maintain a precise synchronization. Subsequent electronics can process the digitized data to reconstruct the density distribution in the VOI.

In one aspect, a multimode passive detection system (MMPDS) includes a detector assembly including an array of drift tubes arranged as detector modules to generate detector signal data from respective detector modules. The detector signal data representing electrical responses to cosmic ray charged particles passing through the respective detector modules and traversing through a volume of interest. The MMPDS includes detector circuitry communicatively coupled to the detector assembly. The detector circuitry measures the generated detector signal data of respective detector modules and outputs the measured detector signal data as spatially segregated data streams corresponding to respective detector modules. The MMPDS includes a clock system communicatively coupled to the detector circuitry. The clock system distributes a master clock signal throughout the detector circuitry. The MMPDS includes a computer cluster including nodes of computing devices communicatively coupled to the detector circuitry. The computer cluster merges the spatially segregated data streams into temporally segregated data, obtains information on tracks of the cosmic ray charged particles traversing the volume of interest based on the temporally segregated data, reconstructs an image of the volume of interest based on the obtained information on the tracks of the cosmic ray charged particles traversing the volume of interest, and identifies an contiguous material regions of interest (ROI) in the volume of interest based on the reconstructed image.

The MMPDS can be implemented in various ways to potentially include one or more of the following features. A subset of the detector modules can be arranged to detect incoming cosmic ray charged particle entering the volume of interest and another subset of the detector modules can be arranged to detect outgoing cosmic ray charged particles exiting the volume of interest. The detector circuitry can include physical interface circuitry communicatively linked to the detector assembly. The physical interface circuitry can filter out high voltage bias signals and receive low level current pulse signals from the measured detector signal data. The detector circuitry can include measurement circuitry communicatively coupled to the physical interface to measure the low level current pulse signals. The measurement circuitry can include amplifier circuitry to amplify the received low level current pulse signals. The measurement circuitry can include comparators to compare the amplified low level current pulse signals against a predetermined threshold. The physical interface circuitry can include a separate interface corresponding to a respective detector module. The detector circuitry can include high voltage distribution circuitry communicatively coupled to the physical interface circuitry to provide a detector module dependent high voltage bias input to the respective detector module. The detector module dependent high voltage bias input for a given detector module can be different from at least one other detector module. The detector circuitry includes a time to digital converter communicatively coupled to the measurement circuitry. The time to digital converter can convert the compared signals into a digital time representation and outputs the digital representation of the compared signals in one of the spatially segregated data streams. The time to digital converter can include a Field Programmable Gate Array (FPGA). The multimode passive detection system can include a user interface for providing one or more functions of the system to a user.

In another aspect, a method of performing multimode passive detection includes generating from a detector assembly including an array of drift tubes arranged as detector modules, detector signal data from respective detector modules. The detector signal data representing electrical responses to cosmic ray charged particles passing through the respective detector modules and traversing through a volume of interest. The method includes measuring from detector circuitry communicatively coupled to the detector assembly, the generated detector signal data of respective detector modules; outputting the measured detector signal data as spatially segregated data streams corresponding to respective detector modules; and distributing a master clock signal throughout the detector circuitry. The method includes processing by a computer cluster including nodes of computing devices communicatively coupled to the detector circuitry, the spatially segregated data streams corresponding to respective detector modules to identify an object in the volume of interest.

The method can be implemented in various ways to potentially include one or more features. Processing the spatially segregated data streams corresponding to respective detector modules to identify an object in the volume of interest can include merging the spatially segregated data streams into temporally segregated data; obtaining information on tracks of the cosmic ray charged particles traversing the volume of interest based on the temporally segregated data; reconstructing an image of the volume of interest based on the obtained information on the tracks of the cosmic ray charged particles traversing the volume of interest; and identifying an object in the volume of interest based on the reconstructed image. The method can include detecting incoming cosmic ray charged particle entering the volume of interest from a subset of the detector modules; and detecting outgoing cosmic ray charged particles exiting the volume of interest from another subset of detector modules. Measuring the detector signal data can include filtering out by physical interface circuitry, high voltage bias signals; and receiving by physical interface circuitry, low level current pulse signals. The method can include amplifying by amplifier circuitry of the detector circuitry, the received low level current pulse signals. The method can include comparing by comparators of the detector circuitry, the amplified low level current pulse signals against a predetermined threshold. The method can include providing by high voltage distribution circuitry communicatively coupled to the physical interface circuitry, a detector module dependent high voltage bias input to a respective detector module. The detector module dependent high voltage bias input for a given detector module can be different from at least one other detector module. The method can include converting by time to digital circuitry of the detector circuitry, the compared signals into a digital time representation; and outputting by the time to digital circuitry of the detector circuitry, the digital representation of the compared signals in one of the spatially segregated data streams.

The system, device and techniques described in this document can implemented as part of an inspection system to inspect volumes of interest for the presence of nuclear threats and other contraband or hazardous items, using ambient or controlled-source illuminating radiation. The described systems, devices and techniques can be used in inspection of large trucks and shipping containers. Other potential embodiments can include, for example, inspection of packages, personnel, or facility access points.

DETAILED DESCRIPTION

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

In a Multi-Mode Passive Detection System (MMPDS), an array of drift-tube detectors/sensors can be configured to enable tomographic imaging of a VOI using ambient cosmic rays as the illuminating radiation source. The cosmic ray charged particles, primarily muons and electrons, traverse through the VOI, and measurement of individual particle tracks can be used to reconstruct a three-dimensional distribution of atomic number (Z) and density of materials in the VOI. The drift tubes can also sense/detect gamma rays emitted by the decay of lightly shielded radioactive materials within the VOI, providing a second modality to detect contraband including special nuclear materials.

Because the incoming cosmic ray charged particles are random in nature (rather than a directed, well-characterized beam as in conventional, active-source tomography systems), aspects of the particle detection including accurate location and timing of the particle trajectories are particularly critical to successful implementation of the tomographic imaging system. Techniques, systems, storage media embodying computer program products and devices are described for time synchronizing signals coming from multiple detector arrays to a common system clock in order to record the signals from the multiple detector arrays against a common time base. The described techniques, devices, storage media embodying computer program products and systems can enable tracking and recreation of trajectories of individual cosmic ray-based particles entering the VOI even when the particles are (a) arriving at unknown times and traveling in unknown directions, (b) being scattered by unknown amounts as the particles traverse the VOI, or (c) being absorbed inside the VOI. To track and create the trajectories of individual particles in above described conditions, the described techniques, systems, storage media embodying computer program products can (a) condition each detector array stably to obtain a reliable timing of detection pulses and (b) synchronize the timing across a large array of detectors (e.g., thousands of drift tubes) with very high accuracy (e.g., to within 5 ns on average). Subsequent electronics can process the digitized data to reconstruct the density distribution in the VOI. Accordingly, the techniques, devices, storage media embodying computer program products and systems described in this document can enable tomography using ambient particle streams from multiple detector arrays in a cost-effective manner.

Electronics for Conditioning Individual Detector Arrays

Figure 1:
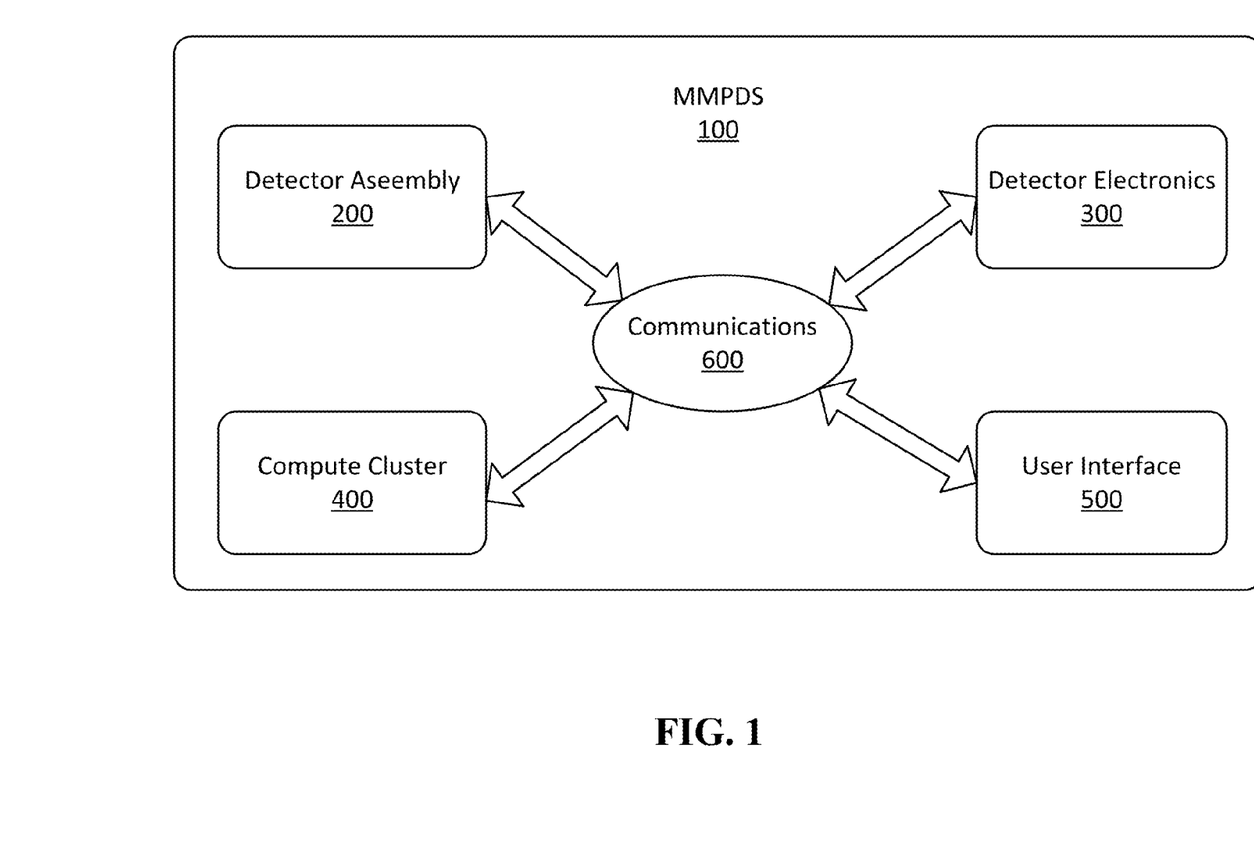
FIG. 1 is a block diagram of an exemplary MMPDS system components and intercomponent communication.

FIG. 1 shows an exemplary MMPDS 100 with four major components. The exemplary MMPDS 100 includes a detector assembly 200, detector electronics or circuitry 300, computer cluster 400, user interface 500, and communications medium 600. The user interface 500 includes one or more graphical user interfaces (GUI) to allow a qualified operator to install, maintain and operate the MMPDS. The detector assembly 200 senses or detects cosmic ray charged particles traversing through a VOI. The detector electronics 300 measures the electrical response of the detector assembly 200 as current pulses, digitally processes the current pulses, and transmits the resultant processed digital representations to the computer cluster 400 to be processed and analyzed. AC main power is provided to the MMPDS system and the provided AC main power can be conditioned as needed to satisfy the MMPDS system components. AC main power is converted into high and low DC voltages for proper operation of various electronic components in the MMPDS system. Low voltages (LV) take standard values and tolerances to operate analog and digital circuitry. High voltage (HV) is used to bias the drift tubes for operation, and is tightly regulated for stable operation. In this document, various aspects of the detector electronics 300 are described.

Figure 2:
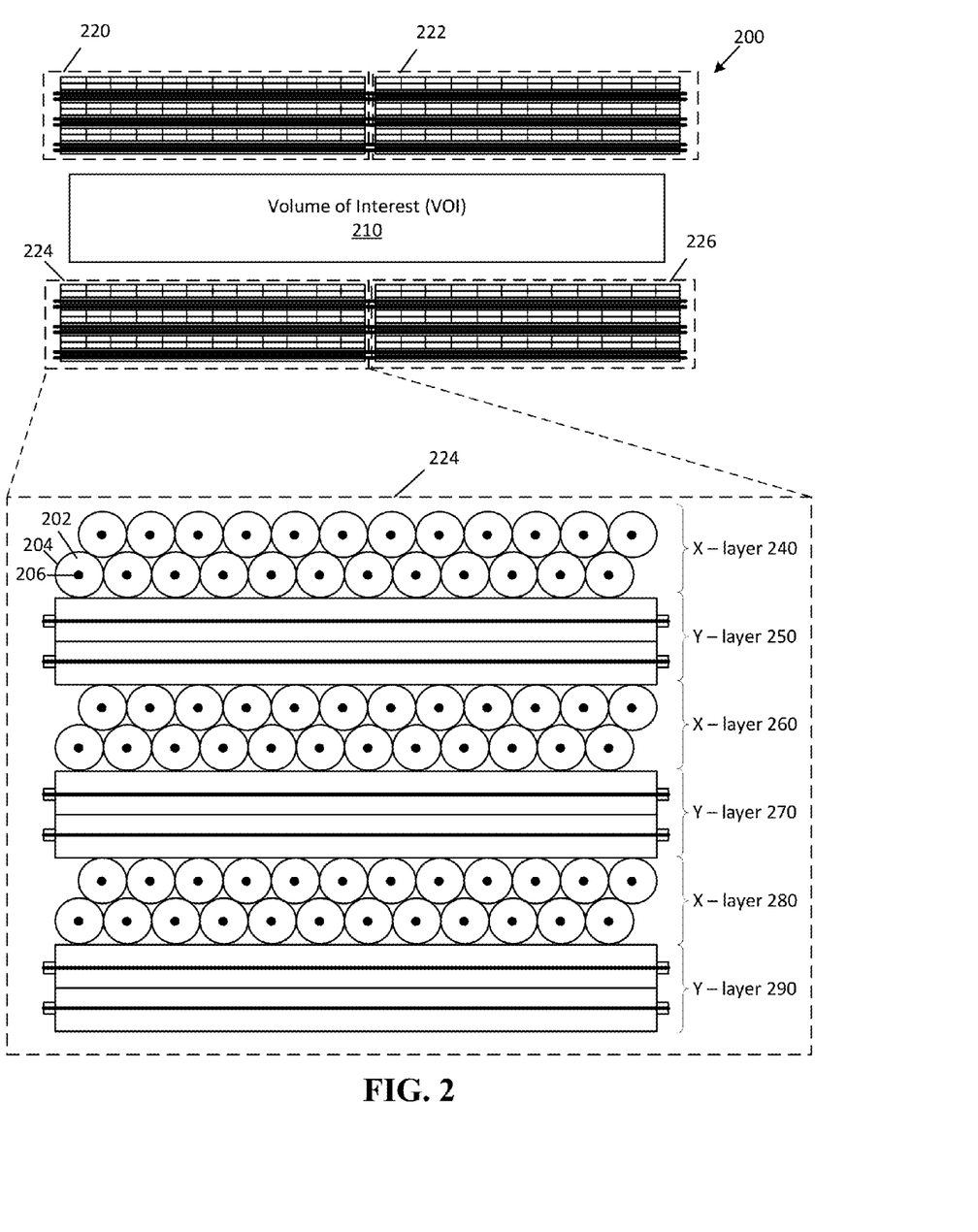
FIG. 2 is a block diagram of an exemplary MMPDS detector assembly.

FIG. 2 is an exemplary detector assembly 200 for detecting cosmic ray charged particles traversing a VOI. As briefly described above, the detector assembly 200 strategically arranged around a VOI 210 (e.g., top and bottom of the VOI) detects and tracks cosmic ray charged particles traversing through the VOI 210. The detector assembly 200 is made up of multiple drift tube arrays designed to allow investigation of the scanned VOI 210. A drift tube 202 is a sealed ionization chamber with a coaxial transmission line filled with a mixture of low-pressure gases. The sealed ionization chamber of a drift tube 202 can be implemented as a hollow cylinder (e.g., 2 inch-diameter aluminum tubes) that is filled with gas and sealed. The aluminum wall of the drift tube acts as a cathode 204. A fine gold plated tungsten-rhenium wire element is strung down the long axis of the tube to act as an anode 206. The drift tube 202 produces electrical signals in response to ionization radiation that passes into or through its volume. The drift tube 202 combines three functions into a single device: sensing, timing and gain.

The gas in the drift tube is ionized by incidence of muons that creates electron-ion pairs. For gamma rays, electrons are produced when the gamma ray is incident on the aluminum shell of the drift tube that then ionizes the gas in the drift tube. Since a high-potential difference is maintained between the anode and the cathode (e.g., nominally 2.9 kV), the electrons thus created drift towards the anode and collide with other molecules along the way, with the positively charged ions moving towards the cathode. The movements of electrons in the electric field produce a measureable current on the anode wire. Then the electrons recombine at the wire. The time that elapses between the muon incidence on the drift tube and the measured signal in the anode wire is known as the drift time. The farther the muon trajectory is from the anode, the longer the drift time. The gas itself includes a mixture of helium ($^4$He), ethane, tetrafluoromethane, and argon, chosen to ensure performance and to sustain the large electrical fields inside the drift tube without breakdown.

In order to inspect a large volume, the drift tubes 202 in the detector assembly 200 are arranged to operate as pairs with each pair representing a signal channel. The total number of signal channels for the detector assembly 200 can vary based on the number of drift tubes 202, for example. The drift tubes 202 can be arranged together into one or more groupings based on the configurations of the drift tubes 202 desired for the detector assembly 200.

On the bottom of FIG. 2 is an exemplary exploded view of a grouping of drift tubes 224 showing a collection of modules arrayed in six layers 240, 250, 260, 270, 280 and 290, alternating between X-facing (e.g., 24-ft) and Y-facing (e.g., 36-ft) modules. While the exploded view is shown for one grouping of drift tubes 224, each of the drift tube groupings can be arranged in substantially similar manner. As described above and shown in FIG. 2, the drift tubes 220, 222, 224 and 226 are arranged to have one grouping of drift tubes (or two groupings of drift tubes arrayed end to end) suspended above the VOI 210 and one grouping of drift tubes (or two grouping of drift tubes arrayed end to end) suspended below the VOI 210 to track cosmic ray charged particles that pass through the VOI 210.

Figure 3:
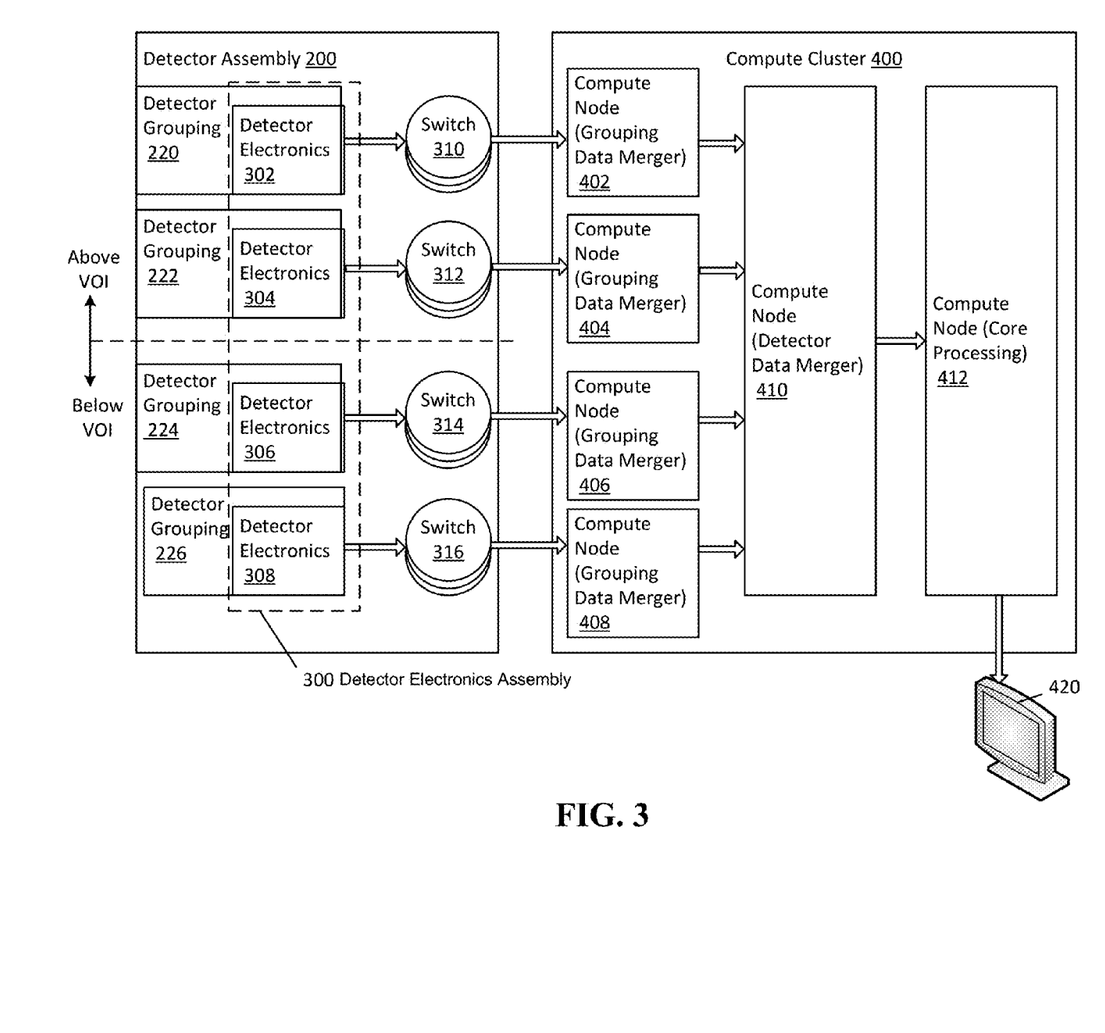
FIG. 3 provides an exemplary data flow of MMPDS.

FIG. 3 is a block diagram showing an exemplary data flow from a grouping of drift tubes to a workstation. Each grouping of drift tubes (e.g., 220, 222, 224 and 226) in the detector assembly 200 is communicatively linked to individual detector electronics 302, 304, 306 and 308 within the detector electronics assembly 300 to transmit the signals from the sensory arrays in the grouping of drift tubes to a compute cluster 400. A separate detector electronics assembly can be associated with each grouping of drift tubes or one or more detector electronics assembly can communicate with multiple grouping of drift tubes. To transmit the sensor signals from the grouping of drift tubes, one or more switches (e.g., 310, 312, 314 and 316) can be implemented to link with the compute cluster 400. Individual sensor signals from the detector electronics assemblies 302, 304, 306 and 308 can be processed by separate grouping of drift tubes compute nodes 402, 404, 406 and 408 within the compute cluster 400 to merge data for each grouping of drift tubes. A detector compute node 410 within the compute cluster 400 can communicate with the individual grouping of drift tubes compute nodes 402, 404, 406 and 408 to merge all data from all grouping of drift tubes. A core compute node 412 within the compute cluster 400 can communicate with the detector compute node 410 to process the merged detector data. An operator working at a workstation (e.g., 420) can access, view and process the data from the core compute node 412.

The detector electronics (e.g., 302, 304, 306 and 308) of the detector electronics assembly 300 can include conditioning electronics or circuitry for conditioning signals from the groupings of drift tubes. The groupings of drift tubes can interface with a common signal conditioning electronics or circuitry. In some implementations, each grouping of drift tubes can be associated with a separate respective conditioning circuitry or electronics to condition drift tube detector signals that includes high voltage and low voltage (HV/LV) signals received from drift tubes of the corresponding grouping of drift tubes, detect pulses corresponding to passage of a cosmic ray based particle through the corresponding grouping of drift tubes, and convert the detected pulses to a digital signal that are timed according to a system-wide synchronized clock. For implementations integrating the individual detector electronics 302, 304, 306 and 308 into a single detector electronics assembly, a single conditioning circuitry or electronics may be used.

Each drift tube detector module can be operated from the conditioning electronics or circuitry that can include a set of analog and digital electronics to perform various tasks including the following:

(1) Electrically bias the drift tube sensors in their optimal operating range;
(2) Convert signal pulses received from the drift tubes into digital, time-tagged pulses; and
(3) Transmit the converted time-tagged pulses to system servers for subsequent processing and analysis.

The conditioning circuitry or electronics can include a high voltage (HV) supply to bias the drift tube and circuitry to process drift tube signals. The HV supply can be designed (e.g., based on a Spellman high-voltage power supply module) to allow high precision monitoring of the output voltage and current. The HV supply can be either electronically or manually controlled and can include digital on/off, high current mode (e.g., in manual operation), local on/off, current and voltage control using digital-to-analog converters (DAC), for example.

Also, the conditioning circuitry or electronics can include a high voltage distribution circuitry that operates as a high voltage splitter that takes a high voltage bias input from the main supply and splits the high voltage bias input into multiple outputs for use in separate detector layers. In calibration process, each drift tube can be operated at its own optimal bias, which can be different from tube to tube. For example, the high voltage distribution circuitry can split the high voltage bias input from the main supply into two layer-compatible outputs. In some implementations, each grouping of drift tubes can have a total of three X-layers, three Y-layers, and three high voltage power supplies. Each power supply can serve one X-layer and one Y-layer, for a total of 30 modules in some implementations.

The circuitry to process drift tube signals can include electronics and/or circuitry for interfacing the drift tubes with signal processing or measuring electronics or circuitry. For example, the circuitry to process drift tube signals can include interface circuitry including physical or wireless connections (e.g., an interface board) to interface with and obtain the detector signals from the drift tubes directly. The interface circuitry can be physically mounted to the drift tubes and manage the communication medium, such as cabling, between drift tubes and remainder of the electronics of the conditioning electronics or circuitry. The interface circuitry can include passive circuitry to filter out the large DC HV bias used for drift tube operation and passes (e.g., using AC coupling) the resulting, small (LV) current signals can be amplified by an amplifier circuitry. Also, the interface circuitry can provide a bus distribution point for the high voltage bias. The interface circuitry can be in communication with circuitry or electronics to detect and amplify the signals from the interface circuitry. In addition, circuitry to perform signal conversion, such as time to digital converters can be included in the circuitry to process drift tube signals.

The circuitry to detect and amplify the detector signals can include measurement circuitry that measures the current induced in the drift tube detectors. For example, the circuitry to detect and amplify the detector signals can convert and amplify the low-level current signals (e.g., tube pulses) from the drift tubes (e.g., arriving via the interface circuitry) into detectable low voltage differential signals and compare these signals with predetermined, set threshold values. Whenever the detected signal is compared against the threshold (e.g., crosses the threshold), the circuitry to detect and amplify the detector signals can transmit a corresponding digital pulse (e.g., low voltage digital asynchronous pulses) to the time to digital converter to indicate how the signal compares against the threshold values (e.g., higher, lower or met the threshold). The amplified signal from the drift tube signal channel can be sampled and processed to determine whether the sampled signal satisfied one or more predetermined thresholds. The circuitry to detect and amplify the detector signals can also provide onboard circuitry for a Built-In Self-Test (BIST) (not shown), as well as the ability to control threshold levels used to process the sampled signal. The BIST circuitry can verify the entire signal chain (e.g., by simulating a tube pulse on the front end of each amplifier) and use one or more discrete digital-to-analog (D/A) channels for each amplifier channel.

The time to digital converter (TDC) can convert a signal of relatively infrequent pulses into a digital time representation. The time to digital converter can use a processing unit such as a Field Programmable Gate Array (FPGA) to implement its function. The time to digital converter can output the absolute time of arrival and length of each pulse received. The time to digital converter may not generate pulse amplitude data in some implementations. In such case, a comparator can be used prior to each channel input. The time to digital converter can handle basic functions (e.g., time-to-digital conversion function) as well as buffering, packaging and transmitting the collected drift tube signal data (e.g., hit packets) to the analysis stream, such as an analysis system shown as compute cluster 400. In addition to its time-to-digital function, the FPGA of the time to digital converter can also instantiate an embedded computing platform to manage data transfer, configure the time to digital converter and peripheral hardware, and monitor the conditioning electronics or circuitry for faults. The time to digital converter can include volatile dynamic random access memory units such as Double Data Rate 2 (DDR2) memory, non-volatile flash memory for firmware and program storage, a high-speed Ethernet port, a clock synchronization interface, and multiple connection points to interface with the mezzanine device (computer servers) and external equipment. The time to digital converter can also control the HV supply using a HV control signal to each drift tube channel, ensuring that its bias is set to defined values for optimal operation.

One or more low voltage supplies (LVS) (not shown) can be included in the conditioning electronics or circuitry to provide power to the time to digital converter and the circuitry to detect and amplify the detector signals.

Referring back to FIG. 3, compute cluster 400 can include multiple compute nodes (e.g., computers) for merging individual grouping of drift tubes data (e.g., 402, 404, 406, 408), compute nodes (e.g., computers) for merging all grouping of drift tubes in the detector and computer nodes for processing the merged detector data. The compute nodes in the cluster 400 can operate in combination to contain and execute the MMPDS data processing and analysis software. While CEP 320 includes firmware and a software kernel (e.g., Linux kernel), the system software for MMPDS is located in the compute nodes. The software in the detector electronics assembly can be an embedded application that is responsible for sending measured current pulses to the compute nodes. Each detector electronics assembly (e.g., 200) merges signals from 24 drift tube channels into a single pulse train.

Referring back to FIGS. 1 and 3, the user interface 500 can be implemented as a graphical user interface (GUI). The GUI 500 allows a qualified operator, maintainer and installer to perform various respective functions. The operator functions of the GUI 500 can include at least the following:

Starting or stopping a scan.
Seeing the display of a scan in progress.
Obtaining an automatic clear or alarm output.
Seeing the display of 3D scans with detected materials and gamma sources.
Seeing a system status indicator display, providing a clear representation of system health.

The maintainer functions available on the GUI 500 can include allowing the maintainer access to all operator functions as well as to perform system monitoring and general diagnostics.

The installer functions available on the GUI 500 can include allowing the installer to access all operator functions as well as functions for initial installation of the system.

Data Capture and Merging

Data is captured from the TDC electronics in a continuous stream. The initial acquisition is performed by hundreds of discrete collection points. In some implementations, over 360 discrete collection points are used to perform the initial acquisition. Therefore, large amounts of data are concurrently being sent in parallel streams to multiple data mergers. At that point, the data are spatially segregated.

Figure 4:
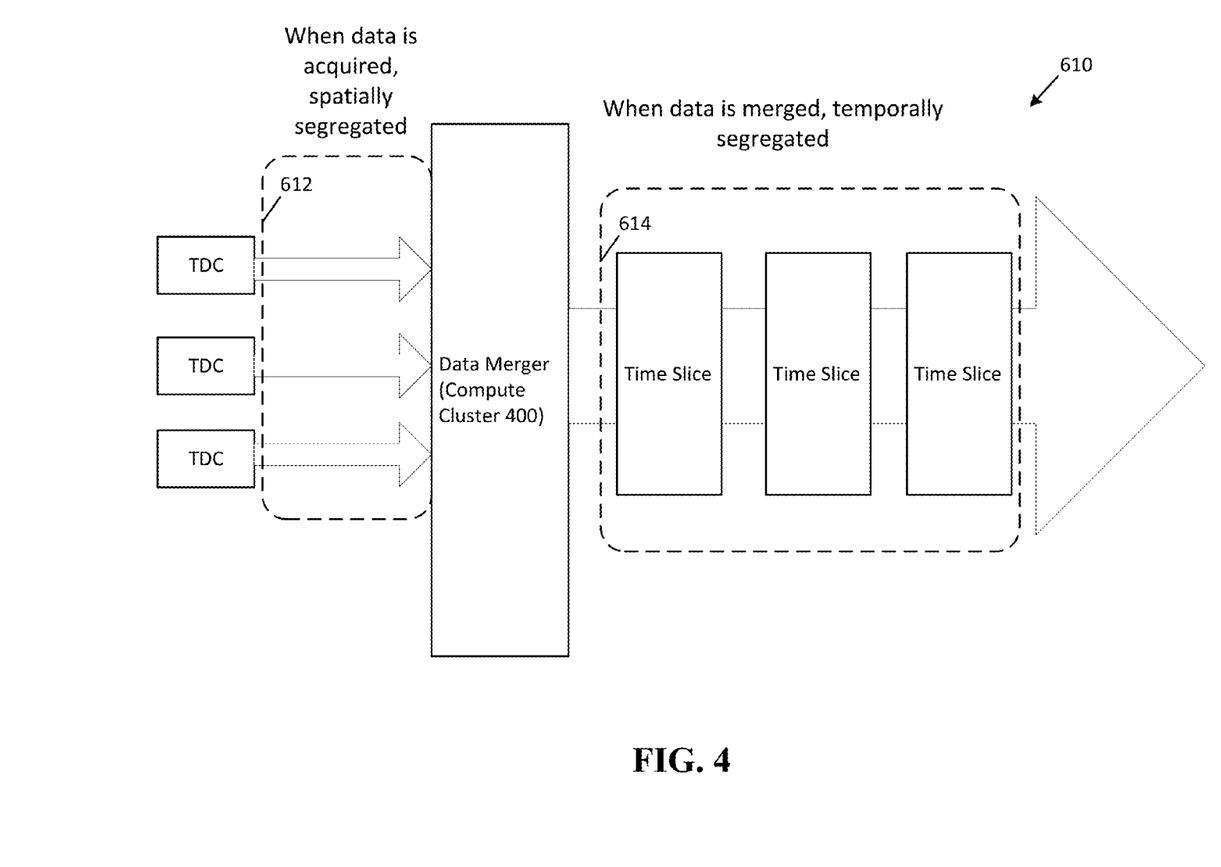
FIG. 4 is a data flow diagram showing an exemplary data merger into time slices.

The data are geometrically split into multiple streams (different streams represent different detector modules). To perform event finding and track fitting, data from all geometric locations of the detector are available simultaneously. To accomplish this, all TDC data are collated, time-stamped, time-sorted, and divided into discrete time increments as shown in FIG. 4. FIG. 4 is a block diagram showing an exemplary data flow 610 for merging drift tube detector data from individual TDC into time slices. Acquired drift tube detector data are spatially segregated (see 612) while the merged data is temporally segregated (see 614). Thus, instead of analyzing a segment of data collected from a section of the MMPDS, the analysis is performed on a detector-wide time-slice of data. The time-slices of data are processed to find and track both muons and gamma rays. This information is processed and combined to reconstruct the image of the scanned volume and identify any regions potentially containing a material of interest. The results are communicated to the operator through a user interface (e.g., a user interface). Also, the system is continually monitored for satisfactory performance with data being recorded and system performance being logged.

Clock Signal Distribution and Synchronization

In addition, to ensure that the high-accuracy timing requirements are satisfied, MMPDS system 100 includes Accurate Clock Synchronization (ACS) implemented across the system to ensure that the high-accuracy timing requirements are satisfied. In implementing the ACS, clocks are synchronized to within a predetermined time in order to enable identification of particle tracks through the detector array in the detection system 200 by pairing incident and emergent particles correctly. Synchronized clock distribution can be implemented using a clock tree scheme with a network of signal distribution equipment linked to provide circuitry to detect and amplify the detector signals with aligned clock and signal edges meeting the timing precision requirement.

An exemplary clock system for MMPDS 100 can take a single-source (i.e., original or master) clock/synchronization from a master circuitry to detect and amplify the detector signals and distribute the single source clock/synchronization to all circuitry to detect and amplify the detector signals in the MMPDS. Multiple splits of the source signal can be used to deliver a single source to multiple devices in a distribution system of multiple synchronizations devices. For example, multiple splits of the original signal can be used to deliver a single source clock/synchronization to multiple devices in a distribution tree. The original or master clock source is obtained by circuitry in the first level, and each subsequent level can buffer the original or master clock source signal for distribution to the upper and lower grouping of drift tubes. Careful design and choice of matched components, including matched cable lengths, can ensure that each parallel path results in minimum time differences (e.g., no larger than a minimum amount of time acceptable) at each conditioning electronics or circuitry.

Data Processing

Figure 5:
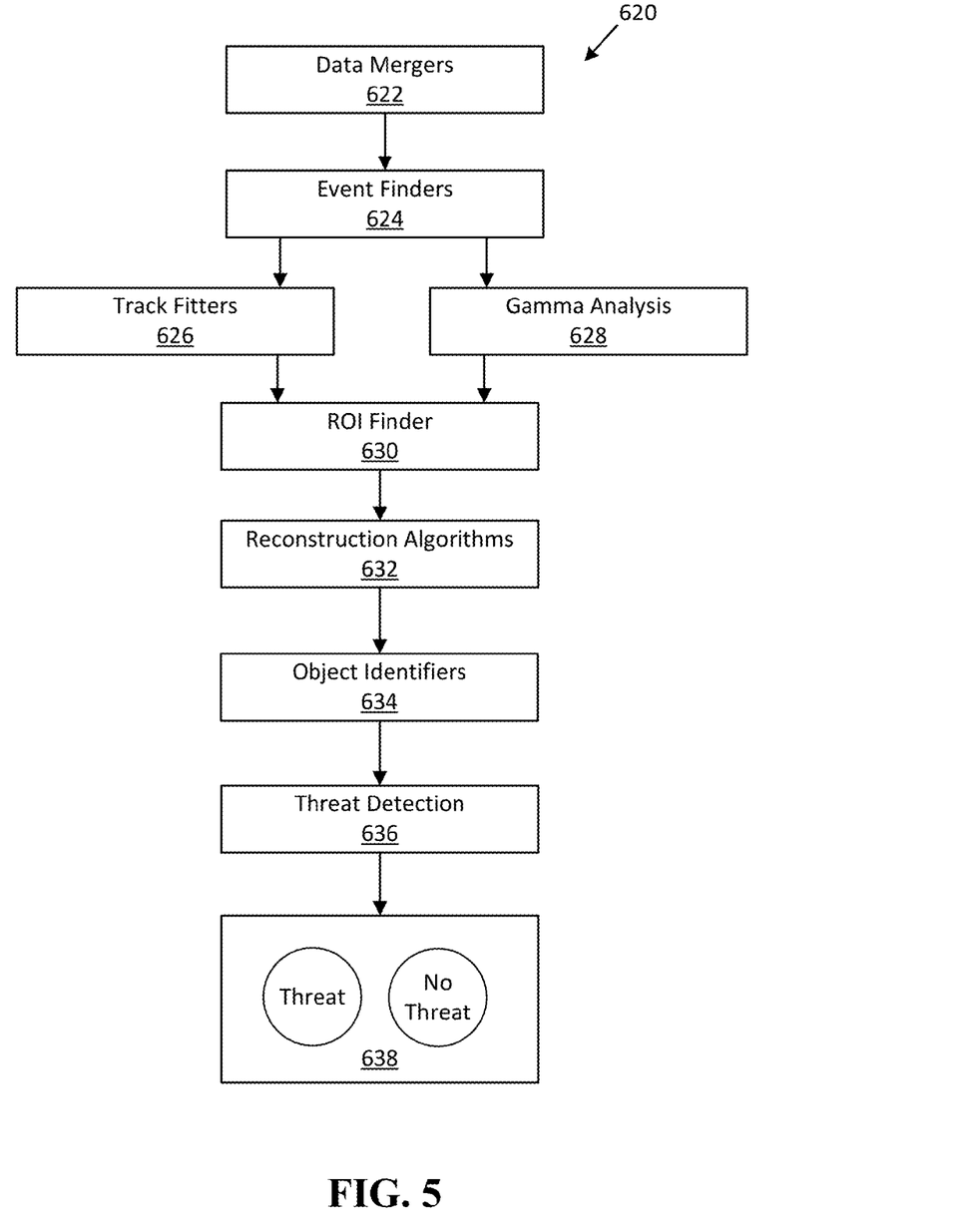
FIG. 5 is a process flow diagram showing an exemplary process for data process and analysis.

FIG. 5 is a data flow diagram showing an exemplary process module 620 for data processing and analysis. The data processing and analysis modules 620 includes one or more data merger processing module(s) 622 to collect tube pulse hit signals received from the TDC controller and merge the collected tube pulse hit signals together to create discrete time increments (epochs) of hits. The MMPDS system can provide a single Data Merger for each sensor module or a group of sensor modules. Each Data Merger collates, sorts by time, and divides the data into discrete epochs within a single epoch window.

The event finder module 624 determines when an event (a particle or gamma source) has occurred. The tube pulse event finder module can identify three types of events in sliding windows of time: Particle Events (hits indicated a particle (muon or electron) passed through the detector), Stopped Particle Events (hits indicating a particle stopped within the detector), and Gamma Events (hits indicating a gamma source). The sliding window can be 500 ns, for example. The event finder 624 can distinguish between the three types of events based on multiplicity of hits.

Track fitter module 626 determines the trajectories of the charged particles, for example muon trajectories. The track fitter 626 uses the particle epochs provided by the event finder 624 and, using a track fitting algorithm, determine the muon trajectories. The Track Fitter 626 can develop tracks for the top sensor module or a group of sensor modules as well as the bottom sensor module or a group of sensor modules.

The region of interest (ROI) finder module 630 uses the information obtained from the track fitter module 626 and, information corresponding to gamma rays from the gamma analysis module 628 to identify one or more regions of interest. The reconstruction algorithms module 632 creates a three-dimensional density map of the scan volume. The reconstruction algorithms module 632 can contain one or more processing algorithms to ensure that the required probability of detection or performance requirements is met. Multiple reconstruction algorithms process modules 632 can be implemented to perform different reconstruction algorithms in parallel. The object identifier module 634 uses the information obtained from the reconstruction algorithms module 632 to identify the object according to particular algorithm(s). The information obtained from the object identifier module 634 is provided to the threat detection module 636 that uses the received information to identify and detect the particular threat. The output of the threat detection module 636 can be used at 638 to identify whether or not a threat exists.

Figure 6:
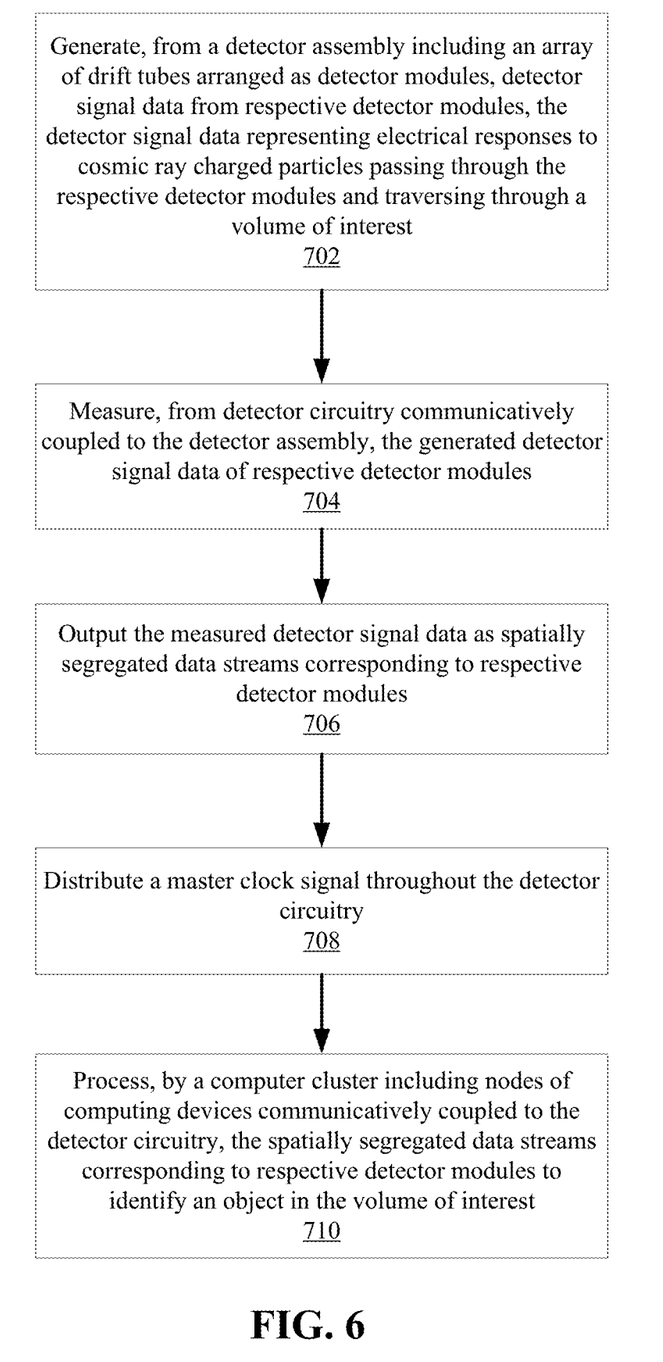
FIG. 6 illustrates a set of exemplary operations that can be carried out for performing multimode passive detection in a detection system that is responsive to naturally occurring ambient charged particles.

FIG. 6 illustrates a set of exemplary operations that can be carried out for performing multimode passive detection in a detection system that is responsive to the detection of naturally occurring ambient charged particles. At 702, the operations include generating, from a detector assembly including an array of drift tubes arranged as detector modules, detector signal data from respective detector modules, where the detector signal data representing electrical responses to cosmic ray charged particles passing through the respective detector modules and traversing through a volume of interest. At 704, the operations include measuring, from detector circuitry communicatively coupled to the detector assembly, the generated detector signal data of respective detector modules. At 706, the measured detector signal data is outputted as spatially segregated data streams corresponding to respective detector modules and, at 708, a master clock signal is distributed throughout the detector circuitry. At 710, the spatially segregated data streams corresponding to respective detector modules is processed by a computer cluster including nodes of computing devices communicatively coupled to the detector circuitry to identify an object in the volume of interest.

While this document contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this document.

What is claimed is:

1. A multimode passive detection system responsive to naturally occurring ambient charged particles, comprising:
    a detector assembly including an array of drift tubes arranged as detector modules to generate detector signal data from respective detector modules, the detector signal data representing electrical responses to cosmic ray charged particles passing through the respective detector modules and traversing through a volume of interest;
    detector circuitry communicatively coupled to the detector assembly, wherein the detector circuitry is configured to measure the generated detector signal data of respective detector modules and output the measured detector signal data as spatially segregated data streams corresponding to respective detector modules;
    a clock system communicatively coupled to the detector circuitry, wherein the clock system distributes a master clock signal throughout the detector circuitry; and
    a computer cluster including nodes of computing devices communicatively coupled to the detector circuitry, the computer cluster configured to
        merge the spatially segregated data streams into temporally segregated data,
        obtain information on tracks of the cosmic ray charged particles traversing the volume of interest based on the temporally segregated data,
        reconstruct an image of the volume of interest based on the obtained information on the tracks of the cosmic ray charged particles traversing the volume of interest, and
        identify an object in the volume of interest based on the reconstructed image.

2. The multimode passive detection system of claim 1, wherein a subset of the detector modules are arranged to detect incoming cosmic ray charged particle entering the volume of interest and another subset of the detector modules are arranged to detect outgoing cosmic ray charged particles exiting the volume of interest.

3. The multimode passive detection system of claim 1, wherein the detector circuitry comprises:
    physical interface circuitry communicatively linked to the detector assembly, the physical interface circuitry to filter out high voltage bias signals and receive low level current pulse signals from the measured detector signal data.

4. The multimode passive detection system of claim 3, wherein the detector circuitry comprises:
    measurement circuitry communicatively coupled to the physical interface to measure the low level current pulse signals, the measurement circuitry including amplifier circuitry to amplify the received low level current pulse signals.

5. The multimode passive detection system of claim 4, wherein the measurement circuitry includes comparators to compare the amplified low level current pulse signals against a predetermined threshold.

6. The multimode passive detection system of claim 5, wherein the detector circuitry includes:
    a time to digital converter communicatively coupled to the measurement circuitry, the time to digital converter to convert the compared signals into a digital time representation and outputs the digital representation of the compared signals in one of the spatially segregated data streams.

7. The multimode passive detection system of claim 6, wherein the time to digital converter comprises a Field Programmable Gate Array (FPGA).

8. The multimode passive detection system of claim 3, wherein the physical interface circuitry include a separate interface corresponding to a respective detector module; and
    the detector circuitry includes high voltage distribution circuitry communicatively coupled to the physical interface circuitry, the high voltage distribution circuitry to provide a detector module dependent high voltage bias input to the respective detector module.

9. The multimode passive detection system of claim 8 wherein the detector module dependent high voltage bias input for a given detector module is different from at least one other detector module.

10. The multimode passive detection system of claim 1, comprising:
    a user interface for providing one or more functions of the system to a user.

11. A method of performing multimode passive detection in a detection system that is responsive to naturally occurring ambient charged particles, the method comprising:
    generating, from a detector assembly including an array of drift tubes arranged as detector modules, detector signal data from respective detector modules, the detector signal data representing electrical responses to cosmic ray charged particles passing through the respective detector modules and traversing through a volume of interest;
    measuring, from detector circuitry communicatively coupled to the detector assembly, the generated detector signal data of respective detector modules;
    outputting the measured detector signal data as spatially segregated data streams corresponding to respective detector modules;
    distributing a master clock signal throughout the detector circuitry; and processing, by a computer cluster including nodes of computing devices communicatively coupled to the detector circuitry, the spatially segregated data streams corresponding to respective detector modules to identify an object in the volume of interest.

12. The method of claim 11, wherein processing the spatially segregated data streams corresponding to respective detector modules to identify an object in the volume of interest includes:

merging the spatially segregated data streams into temporally segregated data;

obtaining information on tracks of the cosmic ray charged particles traversing the volume of interest based on the temporally segregated data;

reconstructing an image of the volume of interest based on the obtained information on the tracks of the cosmic ray charged particles traversing the volume of interest; and identifying the object in the volume of interest based on the reconstructed image.

13. The method of claim 11, comprising:

detecting an incoming cosmic ray charged particle entering the volume of interest from a subset of the detector modules; and detecting an outgoing cosmic ray charged particle exiting the volume of interest from another subset of detector modules.

14. The method of claim 11, wherein measuring the detector signal data comprises:

filtering out, by physical interface circuitry, high voltage bias signals; and receiving, by the physical interface circuitry, low level current pulse signals.

15. The method of claim 14, comprising:

amplifying, by amplifier circuitry of the detector circuitry, the received low level current pulse signals.

16. The method of claim 15, comprising:

comparing, by comparators of the detector circuitry, the amplified low level current pulse signals against a predetermined threshold.

17. The method of claim 16, comprising:

converting, by a time to digital circuitry of the detector circuitry, the compared signals into a digital time representation; and outputting, by the time to digital circuitry of the detector circuitry, the digital representation of the compared signals in one of the spatially segregated data streams.

18. The method of claim 14, comprising, providing, by high voltage distribution circuitry communicatively coupled to the physical interface circuitry, a detector module dependent high voltage bias input to a respective detector module.

19. The method of claim 18, comprising, wherein the detector module dependent high voltage bias input for a given detector module is different from at least one other detector module.

* * * * *